US010627785B2

(12) United States Patent
King et al.

(10) Patent No.: US 10,627,785 B2
(45) Date of Patent: Apr. 21, 2020

(54) PLANT PRODUCTION FEEDBACK CONTROL LOOP OPTIMIZATION

(71) Applicant: iUNU, Inc., Seattle, WA (US)

(72) Inventors: Matthew Charles King, Spanaway, WA (US); Adam Phillip Takla Greenberg, San Francisco, CA (US)

(73) Assignee: IUNU, Inc., Seattle, WA (US)

(*) Notice: Subject to any disclaimer, the term of this patent is extended or adjusted under 35 U.S.C. 154(b) by 904 days.

(21) Appl. No.: 14/811,815

(22) Filed: Jul. 28, 2015

(65) Prior Publication Data

US 2016/0033943 A1 Feb. 4, 2016

Related U.S. Application Data

(60) Provisional application No. 62/030,466, filed on Jul. 29, 2014.

(51) Int. Cl.
*G05B 13/02* (2006.01)

(52) U.S. Cl.
CPC .................. *G05B 13/021* (2013.01)

(58) Field of Classification Search
CPC .................................................. G05B 13/021
See application file for complete search history.

(56) References Cited

U.S. PATENT DOCUMENTS

| 6,185,450 | B1* | 2/2001 | Seguine | A61B 5/0428 128/901 |
| 7,836,168 | B1* | 11/2010 | Vasko | G05B 19/0421 709/224 |
| 7,987,632 | B2* | 8/2011 | May | A01G 7/00 47/17 |
| 8,849,523 | B1* | 9/2014 | Chan | G01S 13/89 701/50 |
| 2008/0296172 | A1* | 12/2008 | Davidson | C25B 1/04 205/639 |
| 2014/0288850 | A1* | 9/2014 | Avigdor | G05B 11/32 702/19 |

* cited by examiner

*Primary Examiner* — Kenneth M Lo
*Assistant Examiner* — Mohammad A Rahman
(74) *Attorney, Agent, or Firm* — Hans Santos, PLLC (57) ABSTRACT

Sensors provide environmental conditions and plant growth information while control devices regulate the conditions. A calculated data point for a growth of a plant may be generated, and an optimum input variable value for the growth may be obtained. A target value for a sensor data point of a sensor that monitors a condition affecting the growth or the calculated data point for the growth may be further acquired. As such, one or more control devices that most strongly correlate with the target value may be determined based on at least one of the optimum input variable value or a vector association array. Thus, at least one control device setting value for the one or more control devices may be ascertained based on a target path for achieving the target value. Accordingly, each control device may be commanded to implement a control device setting value.

25 Claims, 9 Drawing Sheets

Fig. 9

PLANT PRODUCTION FEEDBACK CONTROL LOOP OPTIMIZATION

CROSS REFERENCE TO RELATED PATENT APPLICATION

This patent application claims priority to U.S. Provisional Application No. 62/030,466, entitled "Optimization of Plant Production through Feedback-Control Loop Method and System", filed on Jul. 29, 2014, which is hereby incorporated in its entirety by reference.

BACKGROUND

Typical greenhouses measure environmental conditions with imprecise, analog, one high and one low data point per day. Measurements are usually collected by walking around and looking at the measurement equipment. A typical greenhouse may have dozens or hundreds of different switches, timers and assorted controls spread out inconveniently and inefficiently throughout the greenhouse. Generally, gardening experiments are conducted over weeks or months using side by side, single variable variations against a control group. However, such gardens may not be equipped for precise control or data collection. This lack of precise control and data collect may lead to prolonged experiments using a multitude of ad hoc implicit assumptions. For example, the optimization of plant growth for just two variables, such as $CO_2$ level and temperature, may take months of experimentation.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Multiple instances of certain components are labeled with an element number and letter; all such component instances are equivalent within normal ranges. Multiple instances of otherwise identical components can control, be controlled, or communicate separately through assignment of unique or distinguishing identifiers. Such components may be referred to herein only by element number, without a letter in conjunction therewith, in which case the reference is to any of such components.

As used herein, a "plant" may be at least one of a flowering plant, conifer and other gymnosperm, fern, clubmoss, hornwort, liverwort, moss, green algae, red and brown algae, fungi, archaea, and bacteria (which is a broader definition than commonly applies to just green plants). As used herein, a "room" (including Room 100) is an enclosure, tent, room, or the like. As used herein, a "site" (including Site 101) is an area equal to or larger than a room, such as a building, location, real property, or the like, containing one or more rooms.

Example Architecture

Figure 1:
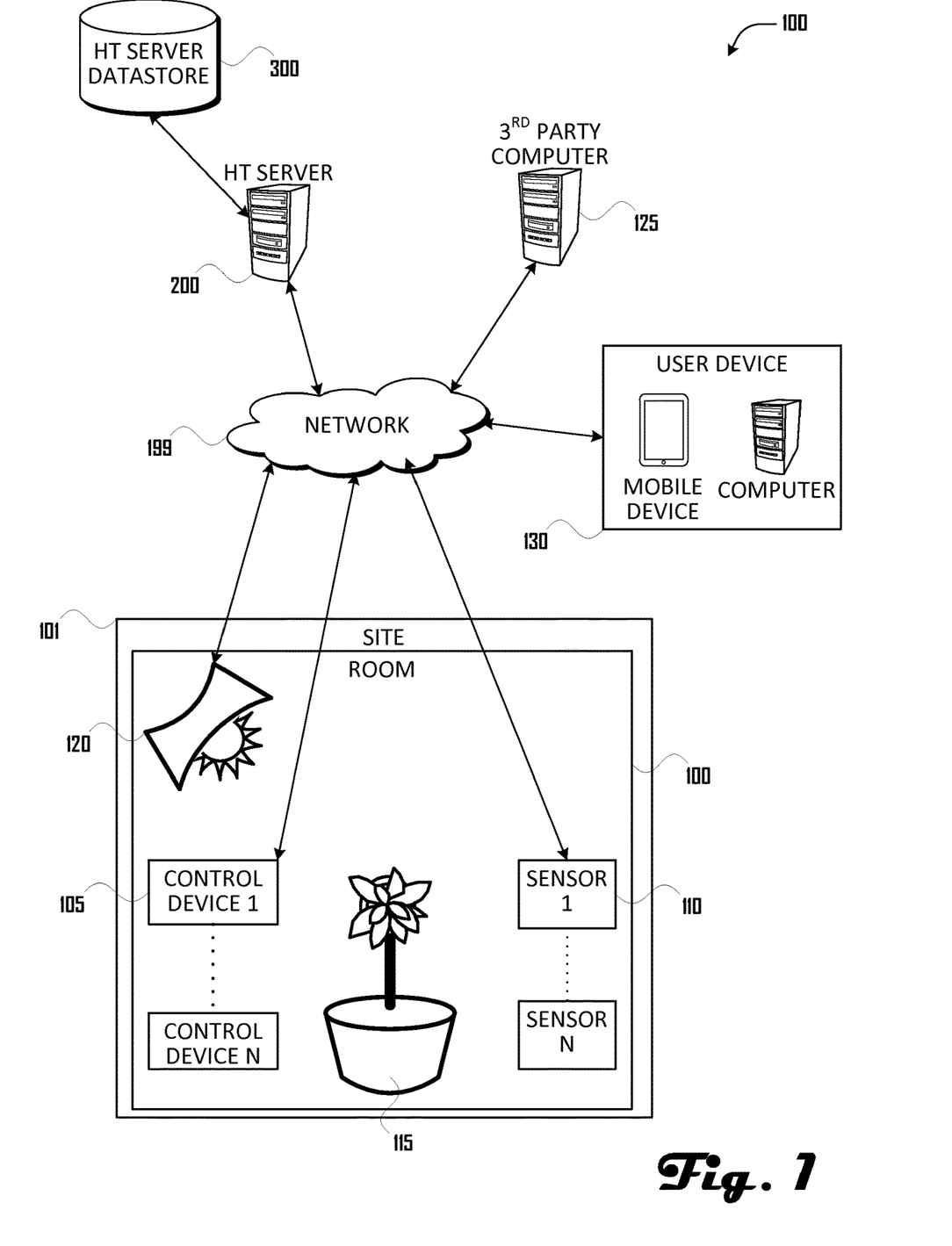
FIG. 1 illustrates an example architecture of computing devices for implementing a plant production feedback control loop.

FIG. 1 illustrates an example network architecture for performing machine learning-based geolocation and hotspot area identification. A server 200 is in communication with a server data store 300 via a network 199. Additionally, the server 200 is further in communication with multiple devices via the network 199. The network 199 may comprises computers, network connections among the computers, and software routines to enable communication between the computers over etwork connections. Examples of Network 199 comprise an Ethernet network, the Internet, and/or a wireless network, such as a GSM, TDMA, CDMA, EDGE, HSPA, LTE, LTE-Advanced or other network provided by a wireless service provider. Connection to Network 199 may be via a wireless or wireline connection. More than one network may be involved in a communication session between the multiple devices. In some embodiments, a computer may execute software routes that include the layers of the Open Systems Interconnection (OSI) model of computer networking to connect to the network 199.

The multiple devices may include control devices, such as control devices 1-N, which are collectively referred to as control devices 105. The multiple components may further include various sensors, such as sensors 1-N, which are collectively referred to as sensors 110. The multiple devices may additionally include an artificial light 120, user device 130, and a third party computer 125. In some instances, the artificial light 120 may be a type of the control devices 105. The multiple devices may communicate directly with each other or via the network 199 without communicating with the server 200. The control devices 105, the sensors 110, and the artificial light 120 may be located in a room 100 that is located on a site 101. Additionally, a plant 115 may be located in the room 100.

The server data store 300 may include logical organizational structures that store data, such as relational databases, object databases, object-relational databases, and/or key-value databases. Accordingly, the server data store 300 may store multiple records, including Site record 305, room record 310, user record 390, and/or the like. This disclosure may discuss a first computer or computer process as connecting to a second computer or computer process. For example, the sensors 110, the control devices 105, the user device 130 or the third party computer 125 may connect to the server 200 or to a corresponding data store, such as the server data store 300. It will be appreciated that such connections may be made to, using, or via other components. For example, a statement that the sensor 110 may connects with or sends data to the server 200 should be understood as saying that sensor 110 may connect with or send data to the server data store 300. References herein to a "database" should be understood as equivalent to a "data store" and vice versa. Although the computers or the databases may illustrated as components integrated in one physical unit, the computers or the databases may be provided by common (or separate) physical hardware and common (or separate) logic processors and memory components. Though discussed as being executed by or within one computing device, the software routines and data groups used by the software routines may be stored and/or executed remotely relative to any of the computers through, for example, application virtualization.

Figure 5:
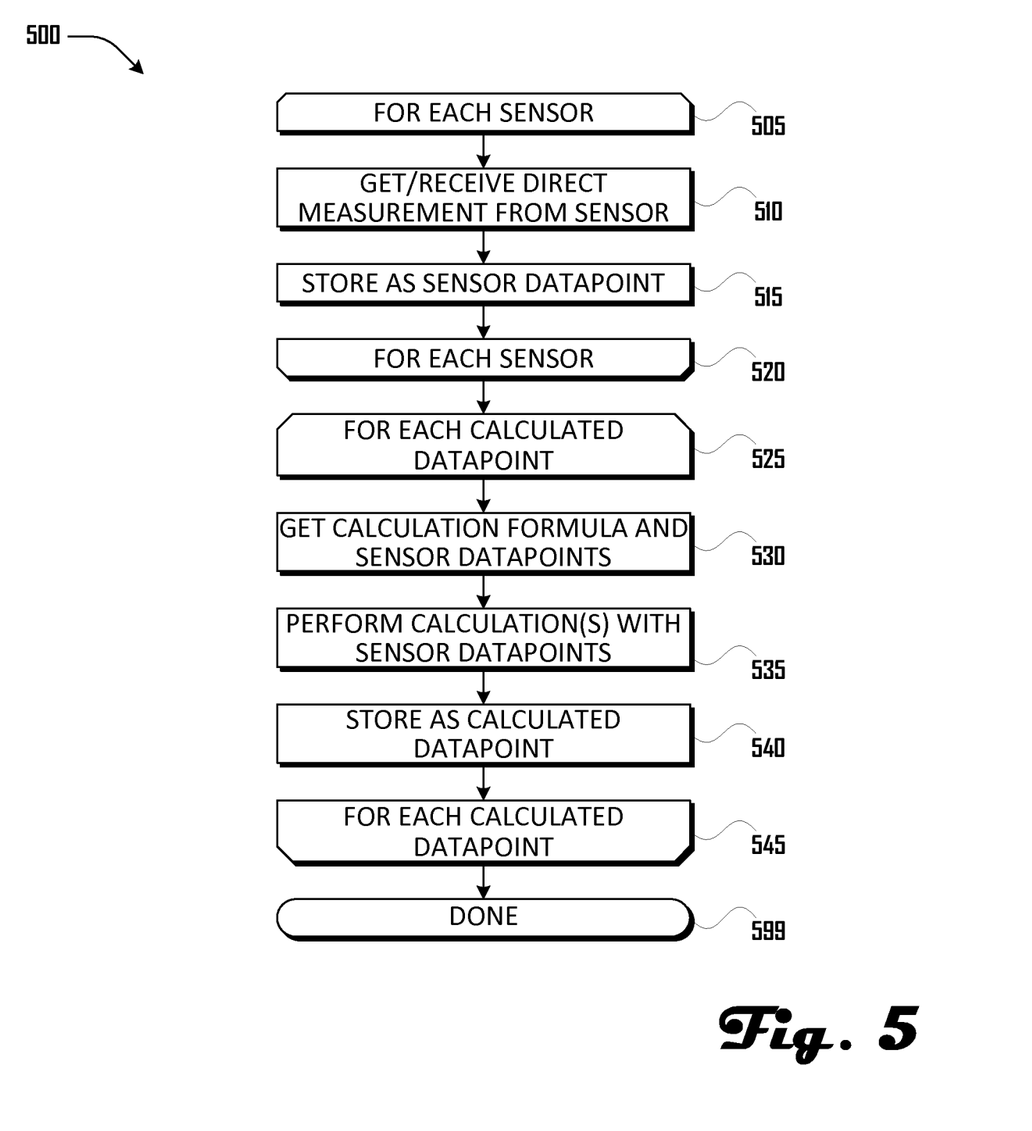
FIG. 5 is a flow diagram of an example process for implementing a measurement routine of a plant production feedback control loop.

The server 200 may obtain and/or receive environmental conditions and other sensor information from the sensors 110 via, for example, measurement routine 500. Each of the sensor 110 may be an electrical or electro-mechanical device with simple output or may be a more complex computer with an independent operating system, user interface, and an interface for interacting with other devices and computers. A non-exhaustive list of sensors 110 examples may include an air temperature thermometer, a soil temperature thermometer, a liquid temperature thermometer, a remote IR temperature sensor (such as to measure leaf temperature), an atmospheric humidity sensor, a soil moisture sensor (such as hygrometer), a $CO_2$ sensor, a gas composition sensor (propane, smoke, and the like). The examples may further include a camera, a light level and color sensor, a pH sensor (for soil and/or liquid), a wind speed and direction sensor, an air pressure sensor, a motion sensor (which may be mechanical, acoustic, or an optical, for sensing plant motion or other motion), flow meters or sensors, position sensors that utilizing global position system (GPS), radio frequency (RF) identification tags attached to plants, and/or the like. The examples may additionally include a sound or acoustic sensor, a liquid level sensor. The sound or acoustic sensor may include a conventional microphone, a high-gain microphone recording capillary activity, or ultrasonic acoustic sensors for range finding and root mas sensing. Other examples may include magnetic sensors (such as a compass, a Hall Effect sensor, etc.,), acceleration sensors, tilt or flex sensors (such as on branches of a plant to measure bending), contact sensors, electromagnetic field (EMF) and other radiation (ionizing or nonionizing) sensors, a circuit sensor (including a circuit breaker sensor), a scale, and/or the like. In some embodiments, some of the sensors 110 may also serve as control devices, such as the control devices 105.

Database records from the sensors 110 may be stored in the server data store 300 as sensor record 335. Additionally or alternatively, database records containing information from the sensors 110 may be stored in, for example, as sensor data point records 340, in which each record may be provided with a date-time stamp.

Figure 7:
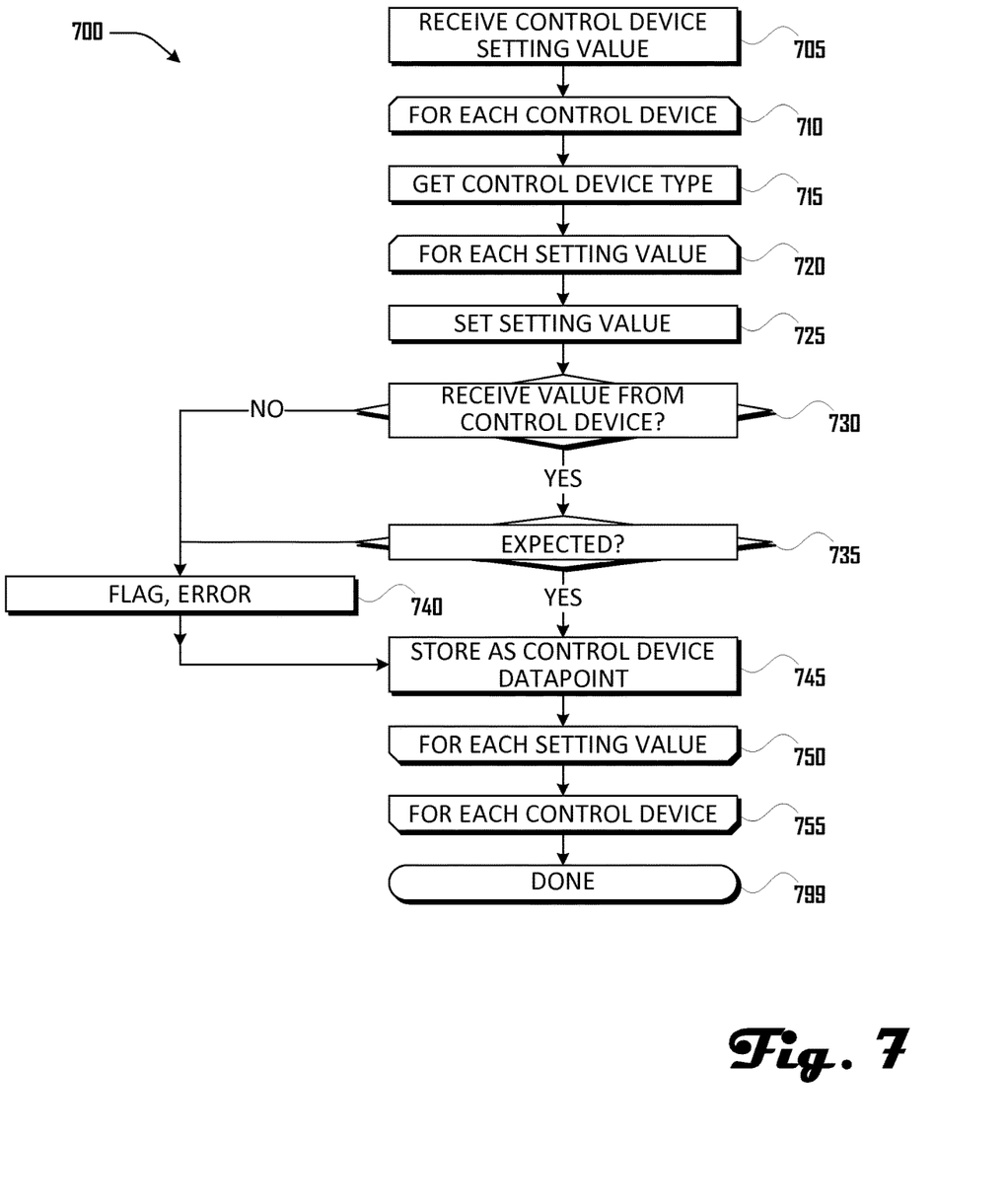
FIG. 7 is a flow diagram of an example process for implementing a device control routine of a plant production feedback control loop.

The server 200 may control environmental conditions in the room 100 and/or the site 101. The environmental conditions may be controlled via device control routine 700 that are implemented by the control devices 105. A non-exhaustive list of control device types may include the following: a relay, a solenoid, motor, and a dimmer. Other examples of types of control devices 105 may include a $CO_2$ emitter or absorber, a valve (whether used for a liquid or a gas, water or another a pH solution, or the like), an artificial light (such as the artificial light 120) or other source of electromagnetic radiation, a louver, a heater, an air conditioner, a fan, a humidifier or dehumidifier, an actuator (such as controlling tilt or pan of a camera, a camera arm, a mechanical belt, a tray, a rotating or slider arm, and/or the like), an acoustic emitter, a switch, a circuit breaker, a liquid pump, a gas pump, and/or the like. Database records regarding types of control devices 105 may be stored in the server data store 300 as records of control device type 325.

Accordingly, the control devices 105 may be classified according to control device type 325, and each control device may be controlled with a command of the corresponding control device type to the control device. For example, in instances in which the control device is the artificial light 120, the artificial light 120 may be controlled so that the light spectrum and/or light level emitted by the artificial light 120 is modified to produce a desired response in a plant's metabolic rate, i.e., relative photosynthesis. The modification of the brightness of the light generated by the artificial light 120 may involve changing a distance between the artificial light 120 and the plant, the use of a dimmer, the use of a louver to partially block the emitted light, and/or so forth. The change in distance may be accomplished using an actuator, a motor, and/or the like. The modification of the light spectrum of the artificial light 120 may involve changing the input voltage and/or current of the artificial light 120, the automatic deployment of spectrum filters to filter the light emitted from the artificial light 120, and/or so forth. In at least one embodiment, some of the control devices 105 may also serve as sensors.

In some instances, the user device 130 may directly send commands to a control device via device control routine 700. In other instances, the user device may send commands to a control device via an API call to the device control routine 700 as stored on the server 200. In the latter instances, the control device may reports its status to the server 200 and/or the device control routine 700). Examples of control commands may include: circuit_on(Control Device IP, circuit #); water_on(room, valve #), circuit_on (control device IP, valve circuit). The commands for a control device may be set with an expiration timer and a priority level.

Database records regarding the control devices 105 may be stored in the server data store 300 as control device record 320. Further, database records containing information regarding settings for the control devices 105 may be stored in, for example, records of control device data point 330, in which each record may be provided with a date-time stamp.

The user device 130 may be a smart phone, a mobile phone, a tablet computer, a laptop computer, a desktop computer, a wearable computer, and/or the like. Users may use the user device 130 illustrates to interact with the server 200, the control devices 105, the sensors 110, and/or the third party computer 125. Database records containing information regarding the user device 130 and users of user device 130 may be stored as user record 390. The database record for a user may contain login credentials and account information of a user. The third party computer 125 may be a computer that is operated by various entities, such as a social media service.

Example Server Components

Figure 2:
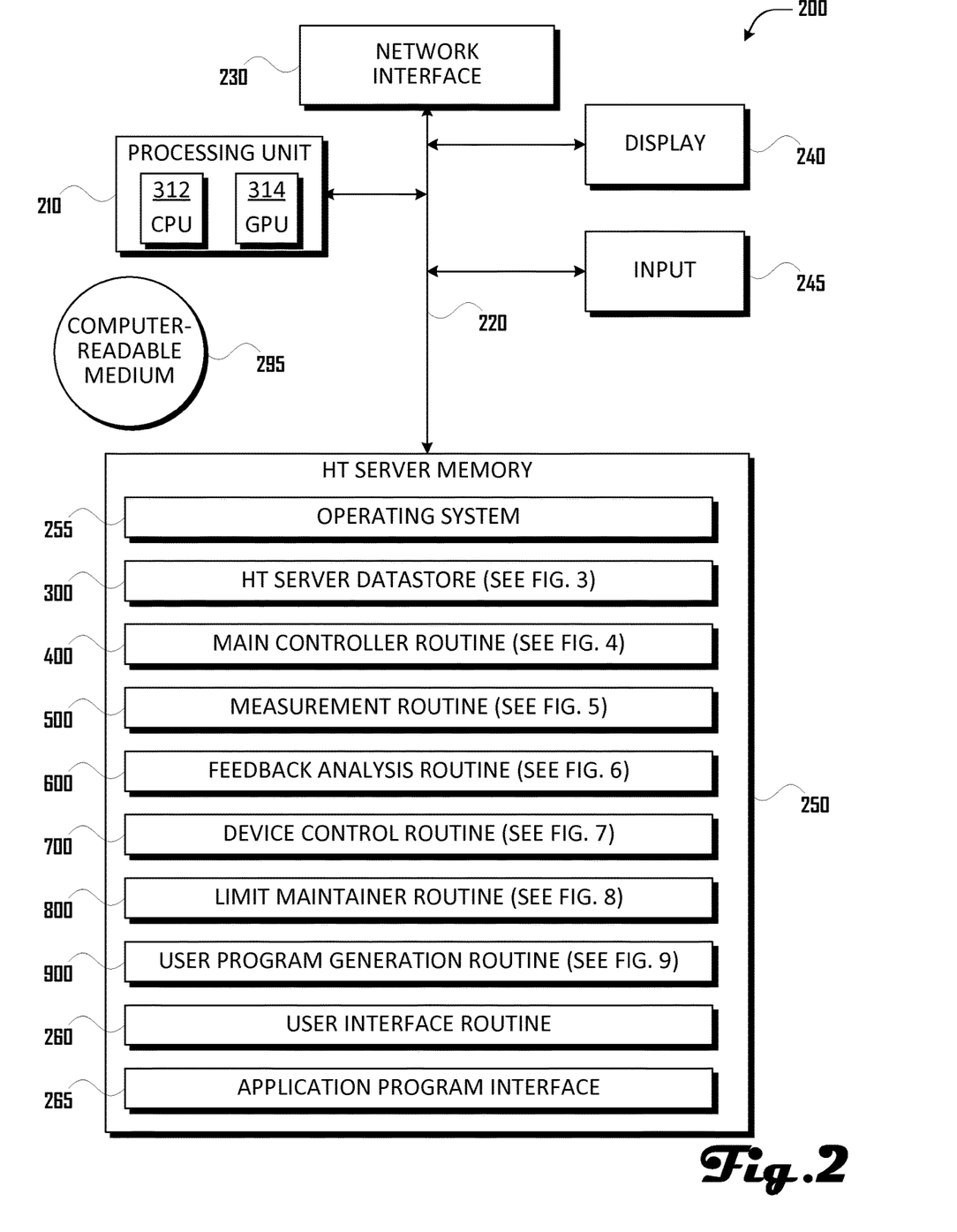
FIG. 2 is a block diagram of an exemplary server for providing a plant production feedback control loop.

FIG. 2 is a block diagram of an exemplary server for providing a plant production feedback control loop. The server 200 may comprises one or more processing unit 210, memory 250, display component 240 and input component 245, all interconnected along with network interface 230 via bus 220. Processing unit 210 may comprise one or more general-purpose Central Processing Units (CPU) 212 as well as one or more special-purpose Graphics Processing Units (GPU) 214. The components of processing unit 210 may be utilized by operating system 255 for different functions required by routines executed by the Server 200, such as the main controller routine 400, the measurement routine 500, the feedback analysis routine 600, the device control routine 700, limit maintainer routine 800, the user program generation routine 900, the user interface routine 260, and application program interface (API) 265. The following routines may be subroutines of the main controller routine 400 or may be executed independently: the measurement routine 500, the feedback analysis routine 600, the device control routine 700, and the limit maintainer routine 800.

The network interface 230 may be utilized to form connections with the network 199 or to form device-to-device connections with other computers. The memory 250 may comprise random access memory (RAM), read only memory (ROM), and a permanent mass storage device, such as a disk drive or synchronous dynamic random-access memory (SDRAM). The memory 250 may store program code for software routines, such as, for example, the main controller routine 400, the measurement routine 500, the feedback analysis routine 600, the device control routine 700, the limit maintainer routine 800, the user program generation routine 900, the user interface routine 260, and the API 265.

The memory 250 may also store program code for browsers, email clients, server applications, client applications, and database applications. Additional data groups for routines, such as for a web server and web browser, may also be present on and executed by the server 200. Web server and browser routines may provide an interface for interacting with the other computing devices through web server and web browser routines. The web server may serve and provide data and information in the form of webpages and HyperText Markup Language (HTML) documents or files. The browsers and web servers are meant to illustrate user and machine interface routines generally, and may be replaced by equivalent routines for serving and rendering information to a computing device and in an interface in a computing device. In addition, the memory 250 may also store the operating system 255.

These software components may be loaded from a non-transitory computer readable storage medium 295 into the memory 250 of the computing device using a drive mechanism associated with the non-transitory computer readable storage medium 295. The non-transitory computer readable storage medium 295 may be a floppy disc, tape, a DVD/CD-ROM drive, a memory card, or other like storage medium. Alternatively or concurrently, the software components may be loaded via a mechanism other than a drive mechanism and computer readable storage medium 295. For example, the software components may be loaded via the network interface 230.

The server 200 may also comprise hardware supporting input modalities. For example, the input components 245 may include a touchscreen, a camera 1205, a keyboard, a mouse, a trackball, a stylus, motion detectors, and a microphone. The Input components 245 may also include a touchscreen display, in which the touchscreen display may respond to input in the form of contact by a finger or stylus with a surface of the touch screen. In some embodiments, the input component 245 and the display component 240 may be an integral part of the Server 200. In other embodiments, the input component 245 and the display component 240 may be components of another device.

The server 200 may further include the bus 220 for communicating with the server data store 300. In various embodiments, Bus 220 may comprise a storage area network (SAN), a high speed serial bus, and/or via other suitable communication technology. The server 200 may communicate with the server data store 300 via the network interface 230. The server 200 may, in some embodiments, include many more components than those shown in FIG. 2. However, it is not necessary that all of these generally conventional components be shown in order to disclose an illustrative embodiment.

The user interface routine 260 may provide a dashboard to the user device 130 with column charts for sites, rooms, and/or plants. The dashboard may present temperature, color coded status, such as blue/transparent for offline, green for operational and in limits, yellow for operational and at/near boundary conditions, red for out of limits. The column charts may hyperlink to details and additional information. The dashboard may provide a sweep counter indicating the time since that last data was collected. The charts and information may be organized by different time intervals, such as the last 24 hours, the last 48 hours, the last week, and the like.

The dashboard may provide device control interfaces to report and change the settings of the control devices 105 and to report and change one or more targets 365 with respect to the plant 115. The dashboard may provide interfaces to report the status of the user program 395 and change the user program 395. The user interface routine 260 may utilize the user record 390 for account log-in authentication and access control via user authentication credentials. For example, the authentication credentials may include credentials for performing face and voice recognition.

Figure 3:
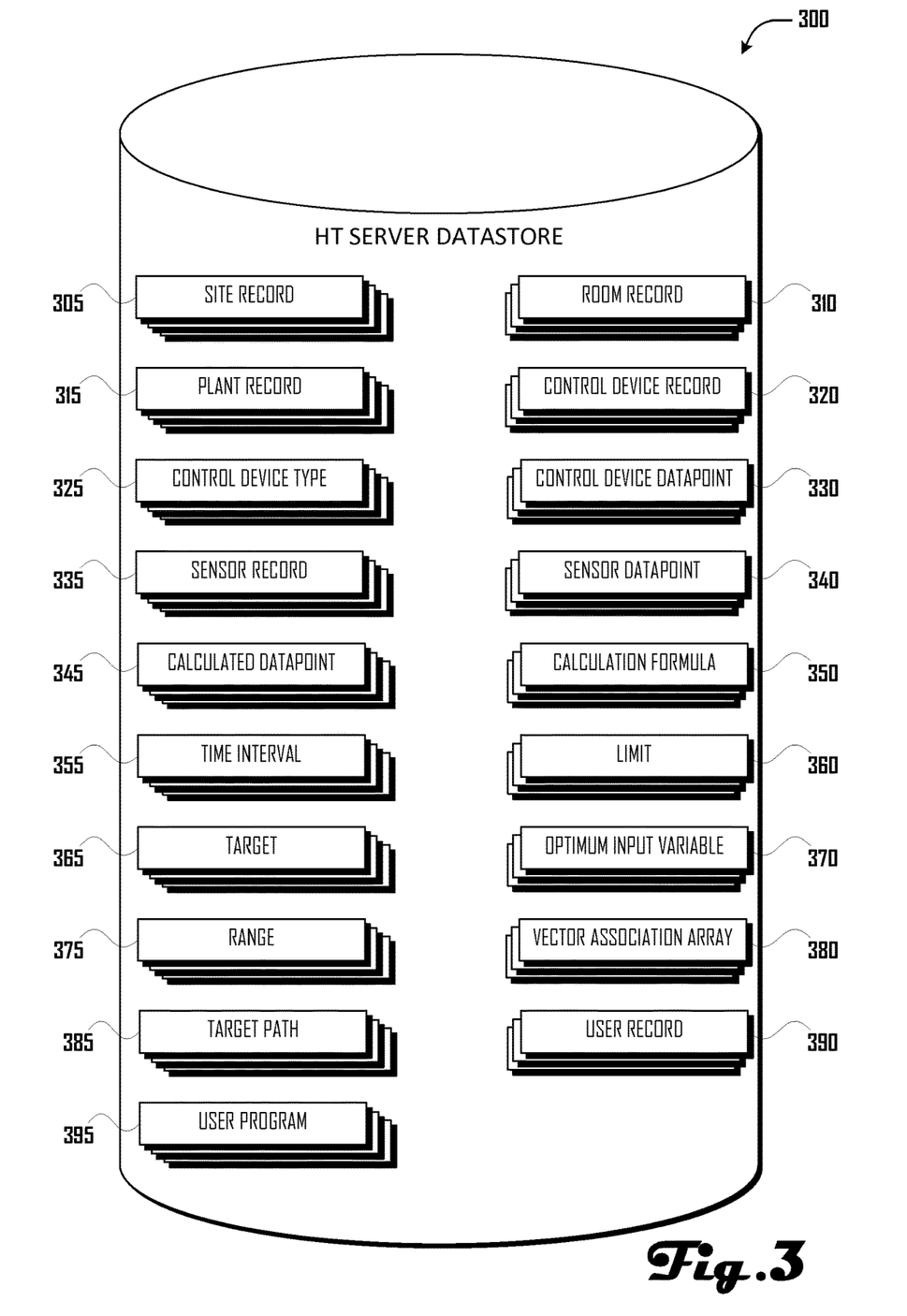
FIG. 3 is a block diagram of a data store for storing data associated with the provision of a plant production feedback control loop.

FIG. 3 is a block diagram of a data store for storing data associated with the provision of a plant production feedback control loop. The illustrated components of server data store 300 are data groups used by routines and are discussed further herein in the discussion of other of the figures. The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Example Processes

FIGS. 4-9 present illustrative processes 400-900 for implementing a plant production feedback control loop. Each of the processes 400-900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-900 are described with reference to FIG. 1.

Figure 4:
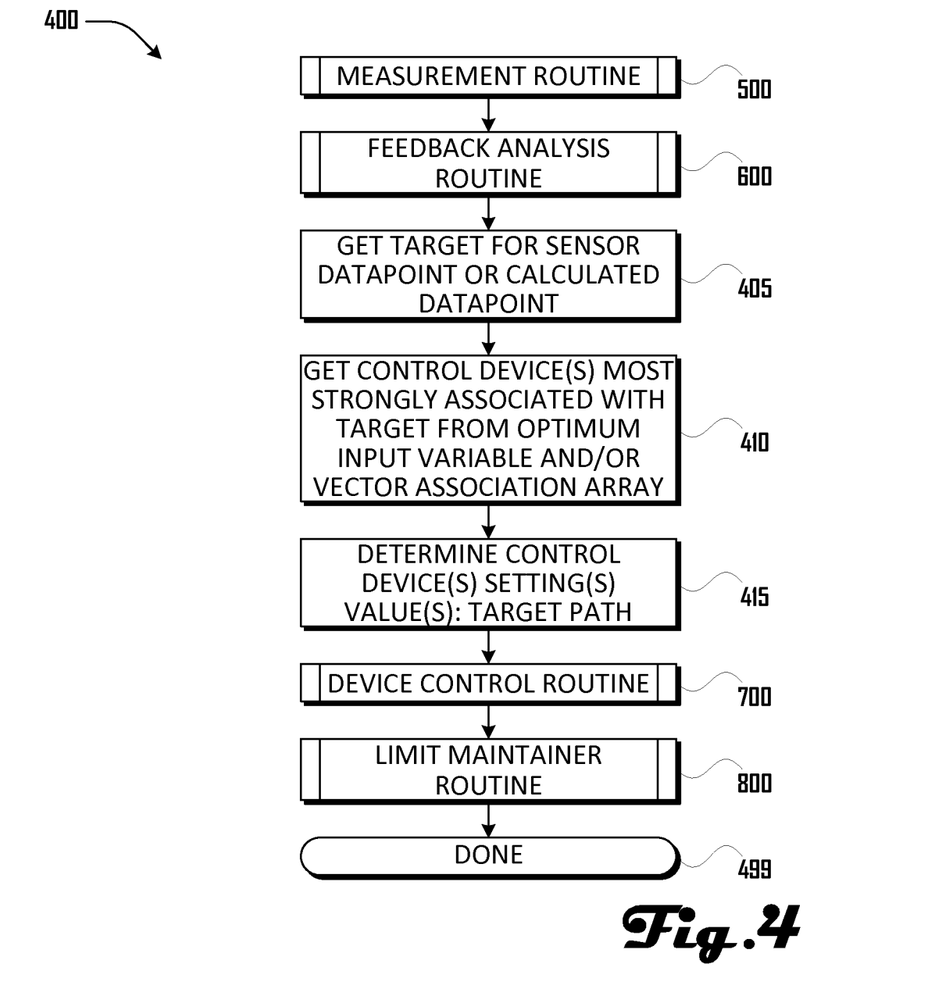
FIG. 4 is a flow diagram of an example process for implementing a main controller routine of a plant production feedback control loop.

FIG. 4 is a flow diagram of an example process for implementing a main controller routine 400 of a plant production feedback control loop. The main controller routine 400 may be executed relative to plant 115, room 100, and/or site 101. At block 500, the main controller routine 400 may execute the measurement routine 500 to access or obtain measurements in the form of sensor data points 340 from the sensors 110. The sensor data points 340 may be used to determine calculated data points 345 according to a calculation formula 350. The measurement routine 500 is discussed further in relation to FIG. 5.

At block 600, the main controller routine 400 may execute the feedback analysis routine 600 to analyze the sensor data points 340, the calculated data points 345 and the control device data point 330. The calculations may be performed across a time interval 355 to develop an optimum input variable 370 and a vector association array 380. The feedback analysis routine 600 is discussed further in relation to FIG. 6.

At block 405, the main controller routine 400 may obtain a target 365. The target 365 may be a desired or targeted sensor data point 340 and/or the calculated data point 345. The target 365 may be obtained from a preset catalog provided by an operator of main controller routine 400, from a user, such as via a user interface, via an API (a machine interface), or via the user program 395. For example, a value of the target 365 may be a moisture, temperature, or light level or may be an outcome, such as maximum total photosynthesis, a plant growth rate, a plant metabolic rate, i.e., relative photosynthesis, or an ester production goal. The target 365 may apply for a time period that is specified relative to a calendar or for a time period that occurs relative to sensor data point 340 and/or calculated data point 345.

At block 410, the main controller routine 400 may obtain a control device that is most strongly associated with the target 365. The control device may be obtained from the optimum input variable 370, the vector association array 380, as specified by the operator of main controller routine 400, and/or by a user, such as via a user interface, an API, or the user program 395. At block 415, the main controller routine 400 may determine setting values for the control device that are calculated to achieve the target 365. For example, a setting value for a control device in the form of the artificial light 120 may be a distance of the light from the artificial light 120, a louver setting for a louver that partially blocks light emission from the artificial light 120, an input voltage or current to the artificial light 120, a light filter setting for the artificial light 120, or another control device setting value that modifies the brightness and/or spectrum of the light that is emitted by the artificial light 120. The setting values may be saved as the target path 385. This determination may be made with reference to the optimum input variable 370, the vector association array 380, as specified by the operator of main controller routine 400, and/or as specified by a user via a user interface, an API, or the user program 395.

At block 700, the main controller routine 400 may execute the device control routine 700 to implement the target path 385 determined at block 415. The device control routine 700 is discussed further in relation to FIG. 7. At block 800, the main controller routine 400 may execute the limit maintainer routine 800 to maintain the sensor data point 340 within the range 375. The limit maintainer routine 800 is discussed further in relation to FIG. 8. At block 499, the main controller routine 400 may conclude, return to a starting state, and/or return to a process that spawned the main controller routine 400.

FIG. 5 is a flow diagram of an example process for implementing the measurement routine 500 of a plant production feedback control loop. At block 505, the measurement routine 500 may initiate an iteration of blocks 510 to 520 for each sensor 110 relative to the room 100 and/or the site 101. At block 510, the measurement routine 500 may obtain or receive a measurement value from the sensor 110. At block 515, the measurement routine 500 may store the value obtained or received at block 510 as sensor data point 340. At block 525, the measurement routine 500 may initiate an iteration of blocks 530 to 545 for each calculated data point 345, which may be performed relative to the plant 115, room 100, and/or the site 101.

At block 530, the calculation formula 350, the corresponding sensor data point 340, or the calculated data point 345 used in the calculation formula 350, may be obtained. The calculation formula 350 may be a formula that determines information of interest. For instance, photosynthesis in plant 115 or an area of plant 115 may be determined by performing a Normalized Difference Vegetation Index (NDVI) calculation on near-infrared and visible spectrum images obtained from the values of the sensor data points 340. In one example, the color of the plant 115 or an area of the plant 115 may be determined by obtaining an image of plant 115 from the values of the sensor data point 340, and deriving the pixel color of an area in the image for the values of the sensor data point 340. In some scenarios, the pixel color that is derived may be relative to a histogram of the image.

In other instances, an area of interest on the plant 115 or in the room 100 may be determined through optical image recognition, through identification of an area in an image by a user, through identification of an area in an image proximate to a tag (which may be identified through optical image recognition), and/or through an identification of a pan or tilt of a camera. For example, optical image recognition of stem and/or flower nodes on Plant 115 may be performed. Accordingly, the physical growth of plant 115 (such as by weight or from images or optical recognition performed relative to images) may be observed, such that any change in such growth value from a corresponding previous value may be calculated.

In another example, the extent of canopy of the plant 115 may be determined from images, such that a change in the canopy growth value from a corresponding previous value may be calculated. In another example, the maturity of the plant 115 may be determined from images, such that a change in the maturity value from a corresponding previous value may be calculated. In yet another example, the amount of water in the plant 115 and/or the room 100 may be determined, such that a change in the amount of water from a corresponding previous amount may be calculated. In a further example, the weight of the plant 115 may be determined, such that a change in the weight from a corresponding previous weight may be calculated.

At block 535, a corresponding calculation Formula 350 is executed with the values of the sensor data point 340. At block 540, the calculated value is stored as the calculated data point 345. At block 599, the measurement routine 500 may conclude, return to a starting state, and/or return to a process that spawned the measurement routine 500.

Figure 6:
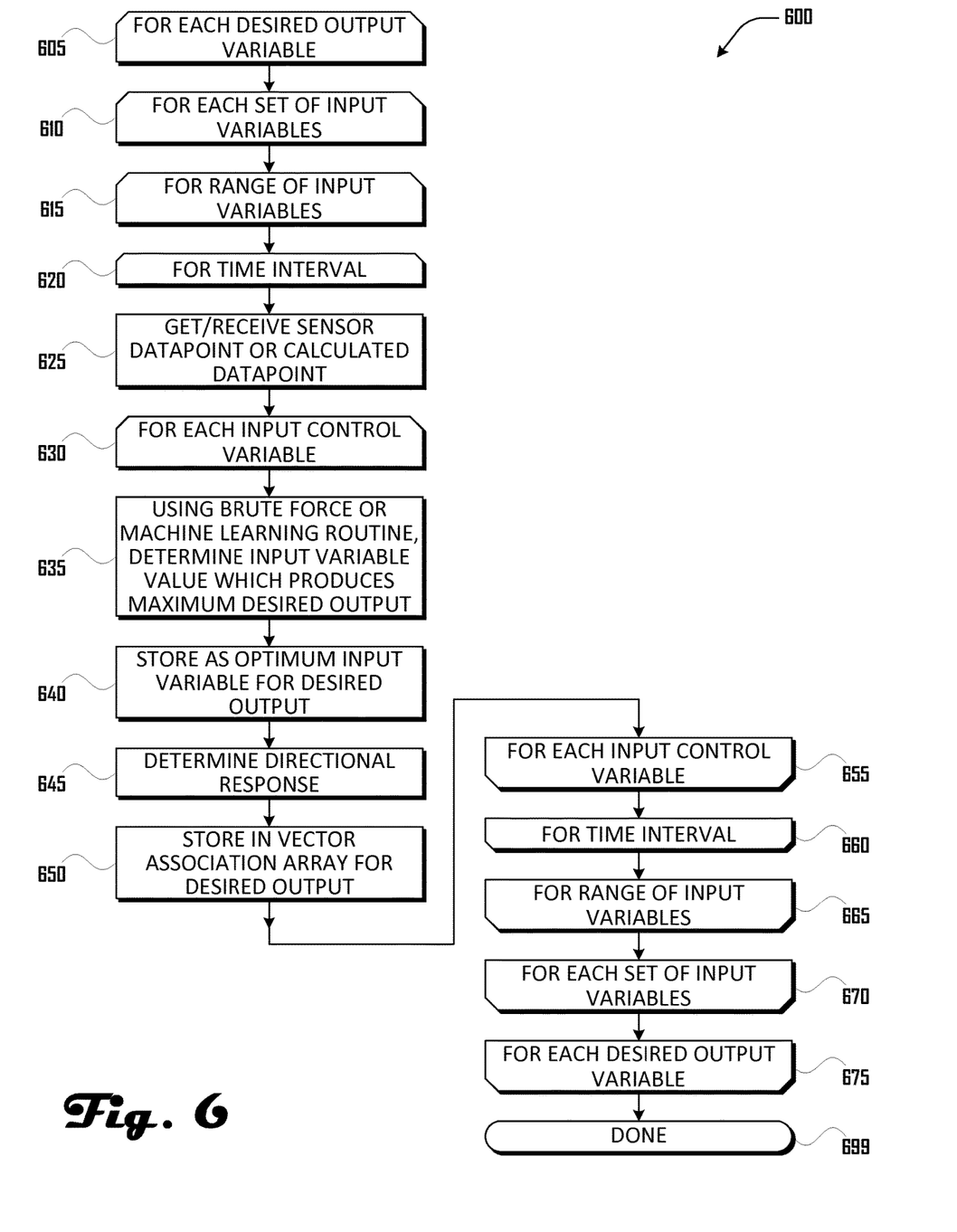
FIG. 6 is a flow diagram of an example processing for implementing a feedback analysis routine of a plant production feedback control loop.

FIG. 6 is a flow diagram of an example processing for implementing the feedback analysis routine 600 of a plant production feedback control loop. At block 605, the feedback analysis routine 600 may initiate an iteration of blocks 610 to 675 for each output variable that is to be analyzed. For example, the output variables may include one or more sensor data point 340 or calculated data point 345. At block 610, the feedback analysis routine may initiate an iteration of blocks 615 to 670 for each input variable to be analyzed. For example, the input variables may include one or more control device data point 330. At block 615, the feedback analysis routine 600 may initiate an iteration of blocks 620 to 665 for each range of input variable of block 610 that is to be analyzed, such as the range 375. At block 620, the feedback analysis routine 600 may initiate an iteration of blocks 625 to 660 for each time interval that is desired to be analyzed, such as the time interval 355.

At block 625, the feedback analysis routine 600 may obtain or receive the sensor data point 340 or the calculated data point 345. At block 630, the feedback analysis routine 600 may initiate an iteration of blocks 635 to 655 for each control variable in the set of input variables of blocks 610 to 670. At block 635, the feedback analysis routine 600 may use a brute force or machine learning algorithm to determine the one or more values for at least one control input variable that produce the maximum desired output variable in the set of desired output variables of blocks 605 to 675.

The brute force or proof by exhaustion algorithm may be used when a limited number of cases are to be considered and/or when there is a longer duration allowed for performing the algorithm. The machine learning algorithm may be utilized when there are a large number of cases or a limited amount of time for performing the algorithm. Types of machine learning algorithms which may be utilized include, for example, decision tree learning, association rule learning, artificial neural networks, inductive logic, support vector machines, clustering, Bayesian networks, reinforcement learning, representation learning, similarity and metric learning, and sparse dictionary learning. The foregoing may be considered single variable optimization, N-variable optimization, or N-dimensional (within limits) vector analysis of variable relationships.

At block 640, the control input variable value that produces the maximum desired output of block 635 may be stored as the optimum input variable 370. At block 645, the direction response between the input variable and desired maximum output may be determined or obtained. The maximum output may be a desired outcome. For example, a maximum output value may be a maximum plant yield, a particular plant color, a specific plant flavor, or another quantifiable plant growth outcome. In other examples, a maximum output value may be the maximum amount of water saved during plant growth, the maximum amount of fertilizer saved during plant growth, or another quantifiable resource use minimization outcome. In turn, the value of the optimum input variable 370 may be calculated to achieve the desired outcome regardless of the desired outcome type. For example, the optimum input variable 370 may be a specific light level, a specific light spectrum or a range of light spectrums, and/or so forth. At block 650, the optimum input variable 370 of block 640 and the determined directional response of block 645 may be stored in a vector association array as the vector association array 380. In blocks 655 to block 675, as a part of performing block 650, a desired output may be stored for each input variable (block 655), for a time interval (block 660), for a range of input variables (block 665), for each set of input variables (block 670), and for each desired output variable (block 675). At block 699, the feedback analysis routine 600 may conclude, may return to a starting state, and/or return to a process that spawned the feedback analysis routine 600.

FIG. 7 is a flow diagram of an example process for implementing the device control routine 700 of a plant production feedback control loop. At block 705, the device control routine 700 may receive one or more setting values for one or more control devices 105. At block 710, the device control routine may initiate an iteration of blocks 715 to 755 for each of the control devices 105. At block 715, the device control routine 700 may obtain the type of a control device 105, for example, from the record of the control device type 325.

At block 720, the device control routine 700 may initiate an iteration of blocks 725 to 750 for each control device setting value. At block 725, the control device setting value may be set by the device control routine 700 making a shell call to the control device 105 with the setting value. At block 730, a determination may be made regarding whether or not a value is received from the control device 105 at block 725. If affirmative, then a determination may be made at block 735 regarding whether or not the received value is expected. If the received value is expected, then the received value may be stored as the control device data point 330 at block 745. If negative at block 730 and/or the block 735, then an error or equivalent may be flagged at block 740.

At block 745, the error or the setting value of block 725 may be stored as the control device data point 330. At block 799, the device control routine 700 may conclude, return to a starting state, and/or return to a process that spawned the device control routine 700.

Figure 8:
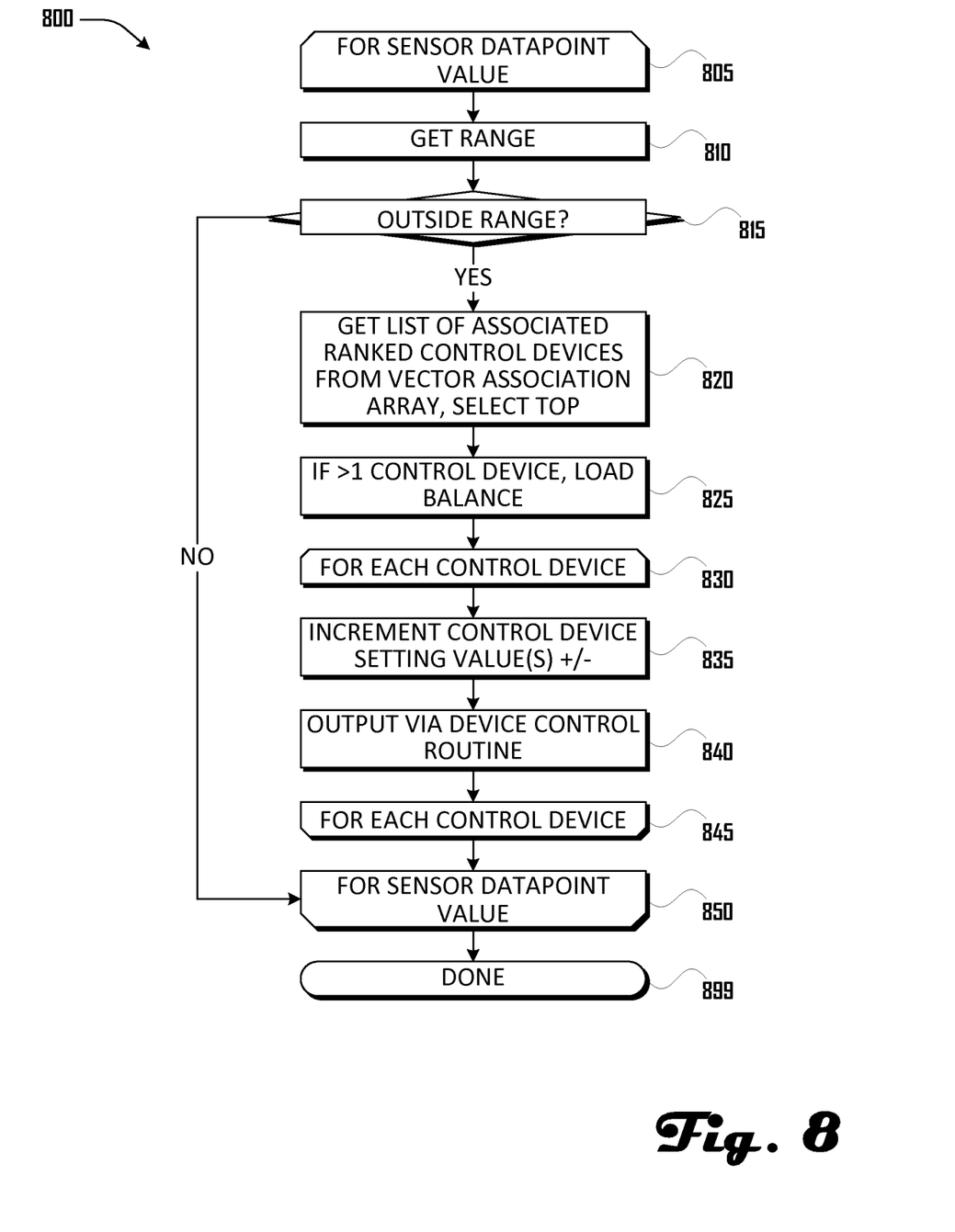
FIG. 8 is a flow diagram of an example process for implementing a limit maintainer routine of a plant production feedback control loop.

FIG. 8 is a flow diagram of an example process for implementing the limit maintainer routine 800 of a plant production feedback control loop. The limit maintainer routine 800 may maintain environmental conditions in the room 100 or otherwise for the plant 115 within a range. Accordingly, the main control routine 400 and the user program 395 may operate without accidentally exceed environmental conditions for the plant 115.

At block 805, the limit maintainer routine 800 may initiate an iteration of blocks 810 to 850 for each sensor data point 340 or the calculated data point 345 that is being monitored. The monitored sensor data point 340 or the calculated data point 345 may be specified by the user program 395.

Alternatively, the monitored sensor data point 340 or the calculated data point 345 may be a part of a maintenance routine provided by the operator of the Server 200. Different maintenance routines may operate at different priority levels and across different time scales. For example, the value of the sensor data point 340 or the calculated data point 345 that is to be monitored may be as simple as temperature of Room 100, or as complex as maximizing photosynthesis via the NDVI calculated data point 345.

At block 810, the allowed range of the sensor data point 340 or the calculated data point 345 may be obtained from the range 375. At block 815, a determination may be made regarding whether or not the sensor data point 340 or the calculated data point 345 is outside the range 375. If affirmative at block 815, a list of one or more control devices 105 associated with the sensor data point 340 or the calculated data point 345 may be obtained from the vector association array 380 at block 820. The one or more control devices 106 may be ranked according to the directional response of the sensor data point 340 or the calculated data point 345 to each control device 105. Accordingly, one or more top ranked control devices 105 may be selected and/or prioritized.

At block 825, if more than one top ranked control device 105 is selected and/or prioritized, the load among the control devices 105 may be balanced. For example, in a scenario in which the temperature is too high, there may be multiple control devices 105 in the form of lights. Accordingly, the reduction in power for dimming the lights to reduce heat may be spread among the lights. At block 830, the limit maintainer routine may initiate an iteration of blocks 835 to 845 for each of the one or more selected or prioritized control devices 105 of block 820.

At block 835, one or more setting values for the one or more control devices 105 of block 820 may be incremented up or down. At block 840, the one or more incremented setting values of block 835 may be output to the device control routine 700. At block 899, the limit maintainer routine 800 may conclude, may return to a starting state, and/or return to a process that spawned the limit maintainer routine 800.

Figure 9:
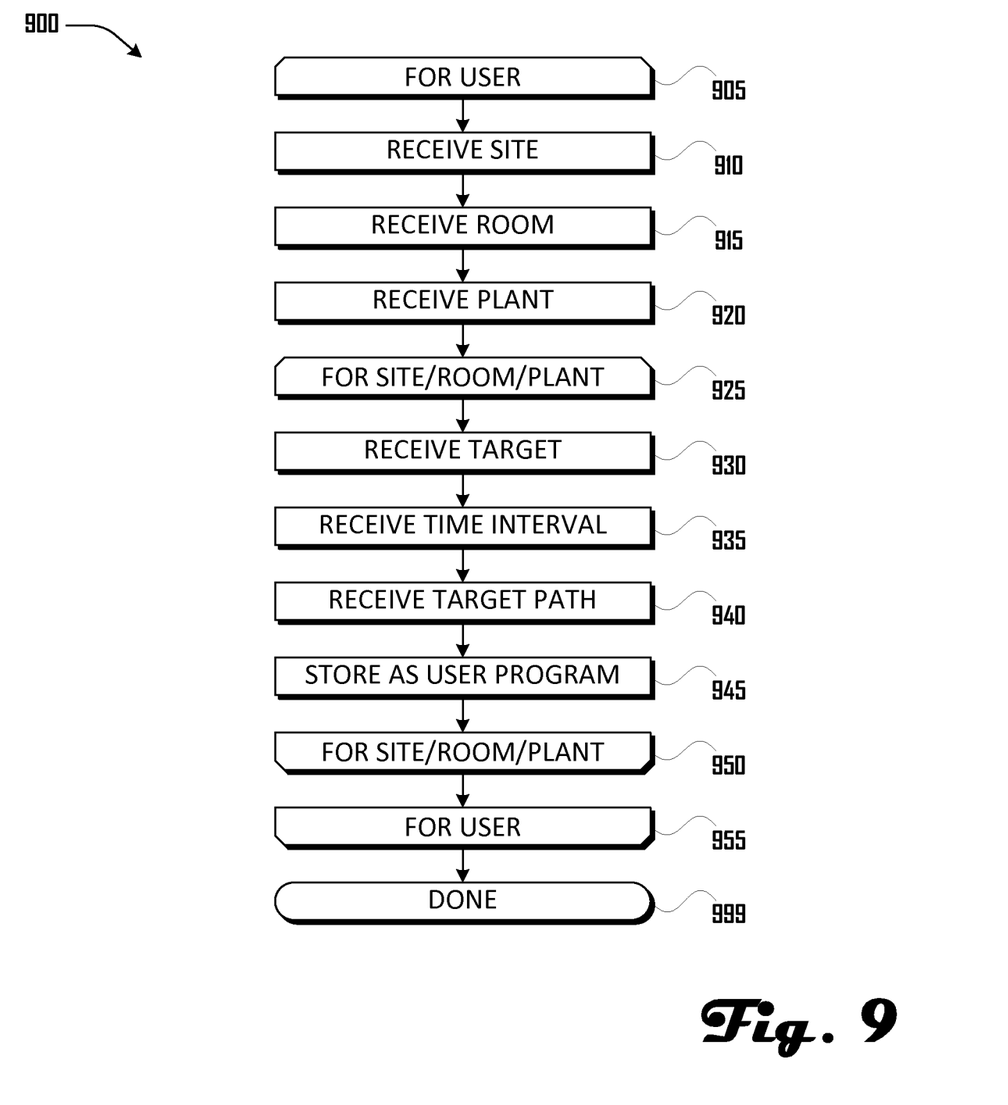
FIG. 9 is a flow diagram of an example process for implementing a user program generation routine of a plant production feedback control loop.

FIG. 9 is a flow diagram of an example process for implementing the user program generation routine 900 of a plant production feedback control loop. At block 905, the user program generation routine 900 may initiate an iteration of blocks 910 to 955 for a user, who may be identified by the user record 390. At block 910, an identifier of a site may be received and stored, such as in the site record 305. At block 915, an identifier of a room may be received and stored, such as in the room record 310. At block 920, an identifier of a plant may be received and stored, such as in the plant record 315.

At block 925, the user program generation routine 900 may initiate an iteration of blocks 930 to 950 for each site, each room, and each plant combination that the user may designate. At block 930, a target may be received, such as the sensor data point 340 and/or the calculated data point 345. The sensor data point 340 and/or the calculated data point 345 may be stored as the target 365. At block 935, a time interval for the target 365 may be received and stored as the time interval 355. At block 940, a target path or means to obtain the target 365 via settings of the control device 105 or the desired Sensor data point 340 may be obtained and stored as the target path 385. In various embodiments, a user may designate the target path 385 via a selection made through the main control routine 400. However, such a designation step may be optional.

At block 945, the values of blocks 930, 935, and 940 may be stored as the user program 395. However, as an alternative to user program generation routine 900, a user may utilize the API 265 to control the server 200 and the routines that are executed by the server 200. For example, by using the API 265, the user may call methods and data classes to directly control a control device 105, to receive information from a sensor 110, and to initiate execution of one or more routines by the server 200. In this way, the API 265 may be used to execute the user's own programs, as written in the user's programming languages, for the user's compatible devices, utilizing one or more of the routines, services, and data classes made available by the routines executed by the server 200

In various embodiments, the data points, target values, input variable values, output variable values, and other values that are described with respect to the software routines illustrated in FIGS. 4-9 may be absolute values or delta values. A delta value is a value that measures change between two states, such as between an initial state and a final state. For example, a target value that is received may be a specific temperature or a specific change in temperature. In another example, a calculated data point may be a specific growth rate for a plant or a specific increase in the growth rate for the plant. In a further example, the optimum input variable value may be an optimum watering rate or an optimum decrease in watering rate. According, the software routines of the plant production feedback control loop as described in the various embodiments may receive, process, and generate absolute values and/or delta values for optimizing plant growth.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Further, any specific numbers noted herein are only examples, and alternative implementations may employ differing values or ranges.

What is claimed is:

1. One or more non-transitory computer-readable media storing computer-executable instructions that upon execution cause one or more processors to perform acts comprising:

identifying an area in an image including a plant, based on an identification tag proximate to the area, wherein the area is located in at least one of a room or a site that includes a plurality of control devices of multiple control device types, wherein the plurality of control devices control conditions that affect a growth of the plant;

executing a measurement routine for the plant, the measurement routine generating a calculated data point for the growth of the plant;

executing a feedback analysis routine for the plant across a time interval to develop an optimum input variable value for the growth of the plant;

obtaining a target value for a sensor data point of a sensor that monitors a condition affecting the growth of the plant or the calculated data point for the growth of the plant;

determining one or more control devices of the plurality of control devices that most strongly correlate with the target value based on at least one of the optimum input variable value or a vector association array;

determining a control device type corresponding to the one or more control devices based on one or more records of control device types that identify the multiple control device types;

ascertaining at least one control device setting value for the one or more control devices based on a target path for achieving the target value for the sensor data point or the calculated data point; and executing a device control routine to generate a command of the control device type to implement the at least one control device setting value by the at least one control device.

2. The one or more non-transitory computer-readable media of claim 1, wherein the sensor is a wind speed and direction sensor.

3. The one or more non-transitory computer-readable media of claim 1, wherein the acts further comprise:

executing a limit maintainer routine on the one or more control devices to maintain the sensor data point within a range, and wherein the executing the limit maintainer routine includes:

obtaining a range for a sensor data point value of a sensor that monitors the condition affecting the growth of the plant;

obtaining a list of one or more control devices associated with the sensor in response to the sensor data point value being outside of the range;

perform an incremental increase or an incremental decrease of a control device setting value for a control device; and outputting the control setting value to the control device via a device control routine.

4. The one or more non-transitory computer-readable media of claim 3, further comprising:

load balancing a load between a plurality of control devices, when the list includes the plurality of control devices.

5. The one or more non-transitory computer-readable media of claim 1, further comprising:

receiving the target value for the plant that is located in at least one of the room or the site;

receiving the time interval for the target value;

receiving the target path for obtaining the target value via at least one control device setting of the one or more control devices or the sensor data point; and storing the target value, the time interval, and the target path in a data store.

6. The one or more non-transitory computer-readable media of claim 1, wherein the sensor is a temperature sensor, a gas composition sensor, a pH sensor, a wind speed sensor, an air pressure sensor, a light sensor, a camera, a motion sensor, a flow sensor, a position sensor, an acoustic sensor, an ultrasonic acoustic sensor, an acceleration sensor, a magnetic sensor, a contact sensor, a tilt sensor, a flex sensor, an electromagnetic field (EMF) sensor, a radiation sensor, or a circuit sensor.

7. The one or more non-transitory computer-readable media of claim 1, wherein the one or more control devices include an artificial light, a relay, a solenoid, a motor, a dimmer, a $CO_2$ emitter, a $CO_2$ absorber, a gas valve, a liquid valve, a louver, a heater, an air conditioner, a fan, a humidifier, a dehumidifier, an actuator, an acoustic emitter, a switch, a circuit breaker, a liquid pump, or a gas pump.

8. The one or more non-transitory computer-readable media of claim 1, wherein the executing the measurement routine includes:

storing a direct measurement received from a sensor as a sensor data point;

retrieving a calculation formula that corresponds to the sensor data point; and obtaining the calculated data point for the growth of the plant by performing a calculation on the sensor data point based on the calculation formula.

9. The one or more non-transitory computer-readable media of claim 1, wherein the executing the feedback analysis routine includes:

retrieving a corresponding sensor data point or a calculated data point for each desired output variable associated with the growth of the plant, each sensor data point or each calculated data point being an input variable in a range of input variables for a time interval;

determining a corresponding input variable value for each input variable that produces a maximum output value for a corresponding desired output variable using a brute force algorithm or a machine learning algorithm;

storing the corresponding input variable value that is determined for each input variable as an optimum input variable value for a corresponding maximum output value;

determining a directional response between each input variable value and the corresponding maximum output value; and storing each directional response with a corresponding optimum input variable value in the vector association array.

10. The one or more non-transitory computer-readable media of claim 1, wherein the executing a device control routine include:

receiving a corresponding control device setting value for each of the one or more control devices;

obtaining a control device type of each control device that corresponds to each control device setting value;

setting the corresponding control device setting value for each of the one or more control devices;

requesting device values from each of the one or more control devices that correspond to control device setting values; and storing a device value that is received from a control device as a control device data point for a corresponding control device setting value of the control device in response to a determination that the device value is an expected value.

11. The one or more non-transitory computer-readable media of claim 10, further comprising:

generating an error message in response to a failure to receive an additional device value that corresponds to an additional control device setting value or in response to a determination that the additional device value is an unexpected value.

12. The one or more non-transitory computer-readable media of claim 10, wherein the one or more control device includes an artificial light, and wherein a control device setting value for the artificial light controls at least one of a light level or a light spectrum that is outputted by the artificial light for the plant.

13. The one or more non-transitory computer-readable media of claim 1, wherein the calculated data point is a maximized photosynthesis of the plant that is obtained via a Normalized Difference Vegetation Index (NDVI) calculation on near-infrared and visible spectrum images as obtained from values of a plurality of sensor data points.

14. The one or more non-transitory computer-readable media of claim 1, wherein the plant is located in a room, and the calculated data point is a temperature of the room.

15. The one or more non-transitory computer-readable media of claim 1, wherein the target value is moisture level, a temperature level, a light level, a photosynthesis rate, a plant growth rate, or a plant ester production rate.

16. A system, comprising:
one or more processors; and
memory including a plurality of computer-executable components that are executable by the one or more processors to perform a plurality of actions, the plurality of actions comprising:
identifying an area in an image including a plant, based on an identification tag proximate to the area, wherein the area is located in at least one of a room or a site that includes a plurality of control devices of multiple control device types, wherein the plurality of control devices control conditions that affect the growth of the plant;
generating a calculated data point for the growth of the plant;
developing an optimum input variable value for the growth of the plant;
obtaining a target value for a sensor data point of a sensor that monitors a condition affecting the growth of the plant or the calculated data point for the growth of the plant;
determining one or more control devices of the plurality of control devices that most strongly correlate with the target value based on at least one of the optimum input variable value or a vector association array;
determining a control device type corresponding to the one or more control devices based on one or more records of control device types that identify the multiple control device types;
ascertaining at least one control device setting value for the one or more control devices based on a target path for achieving the target value for the sensor data point or the calculated data point; and
generating a command of the control device type to implement the at least one control device setting value by the at least one control device.

17. The system of claim 16, wherein the plurality of actions further comprises:
maintaining the sensor data point within a range by performing a limit maintainer routine that includes:
obtaining a range for a sensor data point value of a sensor that monitors the condition affecting the growth of the plant;
obtaining a list of one or more control devices associated with the sensor in response to the sensor data point value being outside of the range;
load balancing a load between a plurality of control devices when the list includes the plurality of control devices;
perform an incremental increase or an incremental decrease of a control device setting value for a control device; and
outputting the control setting value to the control device via a device control routine.

18. The system of claim 16, wherein the sensor is a wind speed and direction sensor, and wherein the generating the calculated data point comprises executing a measurement routine that includes:
storing a direct measurement received from a sensor as a sensor data point;
retrieving a calculation formula that corresponds to the sensor data point; and
obtaining the calculated data point for the growth of the plant by performing a calculation on the sensor data point based on the calculation formula.

19. The system of claim 16, wherein the developing the optimum input variable comprises executing a feedback analysis routine that includes:
retrieving a corresponding sensor data point or a calculated data point for each desired output variable associated with the growth of the plant, each sensor data point or each calculated data point being an input variable in a range of input variables for a time interval;
determining a corresponding input variable value for each input variable that produces a maximum output value for a corresponding desired output variable using a brute force algorithm or a machine learning algorithm;
storing the corresponding input variable value that is determined for each input variable as an optimum input variable value for a corresponding maximum output value;
determining a directional response between each input variable value and the corresponding maximum output value; and
storing each directional response with a corresponding optimum input variable value in the vector association array.

20. The system of claim 16, wherein the commanding the one or more control devices comprises executing a device control routine that include:
receiving a corresponding control device setting value for each of the one or more control devices;
obtaining a control device type of each control device that corresponds to each control device setting value;
setting the corresponding control device setting value for each of the one or more control devices;
requesting device values from each of the one or more control devices that correspond to control device setting values; and
storing a device value that is received from a control device as a control device data point for a corresponding control device setting value of the control device in response to a determination that the device value is an expected value; and
executing a limit maintainer routine on the one or more control devices to maintain the sensor data point within a range.

21. A computer-implemented method, comprising:
identifying an area in an image including a plant, based on an identification tag proximate to the area, wherein the area is located in at least one of a room or a site that includes a plurality of control devices of multiple control device types, wherein the plurality of control devices control conditions that affect a growth of the plant;
executing a measurement routine for the plant, the measurement routine generating a calculated data point for the growth of the plant;
executing a feedback analysis routine for the plant across a time interval to develop an optimum input variable value for the growth of the plant;
obtaining a target value for a sensor data point of a sensor that monitors a condition affecting the growth of the plant or the calculated data point for the growth of the plant;

determining one or more control devices of the plurality of control devices that most strongly correlate with the target value based on at least one of the optimum input variable value or a vector association array;

determining a control device type corresponding to the one or more control devices based on one or more records of control device types that identify the multiple control device types;

ascertaining at least one control device setting value for the one or more control devices based on a target path for achieving the target value for the sensor data point or the calculated data point;

generating a command of the control device type to implement the at least one control device setting value by the at least one control device; and executing a limit maintainer routine on the one or more control devices to maintain the sensor data point within a range.

22. The computer-implemented method of claim 21, wherein the executing the measurement routine includes:

storing a direct measurement received from a sensor as a sensor data point;

retrieving a calculation formula that corresponds to the sensor data point; and obtaining the calculated data point for the growth of the plant by performing a calculation on the sensor data point based on the calculation formula.

23. The computer-implemented method of claim 21, wherein the executing the feedback analysis routine includes:

retrieving a corresponding sensor data point or a calculated data point for each desired output variable associated with the growth of the plant, each sensor data point or each calculated data point being an input variable in a range of input variables for a time interval;

determining a corresponding input variable value for each input variable that produces a maximum output value for a corresponding desired output variable using a brute force algorithm or a machine learning algorithm;

storing the corresponding input variable value that is determined for each input variable as an optimum input variable value for a corresponding maximum output value;

determining a directional response between each input variable value and the corresponding maximum output value; and storing each directional response with a corresponding optimum input variable value in the vector association array.

24. The computer-implemented method of claim 21, wherein the sensor is a wind speed and direction sensor, and wherein the executing a device control routine include:

receiving a corresponding control device setting value for each of the one or more control devices;

obtaining a control device type of each control device that corresponds to each control device setting value;

setting the corresponding control device setting value for each of the one or more control devices;

requesting device values from each of the one or more control devices that correspond to control device setting values; and storing a device value that is received from a control device as a control device data point for a corresponding control device setting value of the control device in response to a determination that the device value is an expected value.

25. The computer-implemented method of claim 21, wherein the executing the limit maintainer routine includes:

obtaining a range for a sensor data point value of a sensor that monitors the condition affecting the growth of the plant;

obtaining a list of one or more control devices associated with the sensor in response to the sensor data point value being outside of the range;

load balancing a load between a plurality of control devices when the list includes the plurality of control devices;

perform an incremental increase or an incremental decrease of a control device setting value for a control device; and outputting the control setting value to the control device via a device control routine.

* * * * *

UNITED STATES PATENT AND TRADEMARK OFFICE
CERTIFICATE OF CORRECTION

PATENT NO. : 10,627,785 B2  
APPLICATION NO. : 14/811815  
DATED : April 21, 2020  
INVENTOR(S) : Matthew Charles King and Adam Phillip Takla Greenberg Page 1 of 1

It is certified that error appears in the above-identified patent and that said Letters Patent is hereby corrected as shown below:

In the Claims

Column 13 In Claim 3, Line 32, delete "perform" and insert -- performing --.

Column 15 In Claim 17, Line 59, delete "perform" and insert -- performing --.

Column 18 In Claim 25, Line 36, delete "perform" and insert -- performing --.

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*